United States Patent
Xie et al.

(10) Patent No.: US 6,173,029 B1
(45) Date of Patent: Jan. 9, 2001

(54) HIGHER ORDER DETECTOR Z-SLOPE CORRECTION FOR A MULTISLICE COMPUTED TOMOGRAPHY SYSTEM

(75) Inventors: Min Xie, Waukesha; Guy M. Besson, Wauwatosa; Neil B. Bromberg, Milwaukee, all of WI (US)

(73) Assignee: General Electric Company, Milwaukee, WI (US)

( * ) Notice: Under 35 U.S.C. 154(b), the term of this patent shall be extended for 0 days.

(21) Appl. No.: 09/139,992

(22) Filed: Aug. 25, 1998

(51) Int. Cl.$^7$ .................................................. A61B 6/03
(52) U.S. Cl. .............................................. 378/4; 378/901
(58) Field of Search .................................. 378/4, 15, 19, 378/901

(56) References Cited

U.S. PATENT DOCUMENTS

| | | | |
|---|---|---|---|
| 4,284,950 | * 8/1981 | Burl et al. | 324/320 |
| 5,301,108 | 4/1994 | Hsieh | 378/8 |
| 5,579,359 | 11/1996 | Toth | 378/19 |
| 5,610,963 | * 3/1997 | Hsieh | 378/7 |

* cited by examiner

*Primary Examiner*—David V. Bruce
(74) *Attorney, Agent, or Firm*—Armstrong Teasdale; Christian G. Cabou; Phyllis Y. Price (57) ABSTRACT

The present invention comprises a system and method for correcting for z-slope variations in detector cell outputs represented by data obtained by a scan in a CT system. According to one aspect of the invention, a final error factor, based upon a combination of a correction factor and an initial error factor, is applied to the data. The correction factor having a computational complexity independent of the order of correction desired. The present invention transfers all of the computational complexity of z-slope correction to a calibration process, thereby improving the computational speed and efficiency of producing an accurate image based on the scan data. In another aspect, the present invention improves image quality by providing a correction factor comprising a plurality of channel correction factors, where each of the plurality of channels is the center channel for a corresponding moving segment used to respectively determine each of the channel correction factors.

16 Claims, 3 Drawing Sheets

HIGHER ORDER DETECTOR Z-SLOPE CORRECTION FOR A MULTISLICE COMPUTED TOMOGRAPHY SYSTEM

FIELD OF THE INVENTION

This invention relates generally to computed tomography (CT) imaging and more particularly, to correcting image data for any error introduced into such data due to combining the output signals of x-ray detector cells having different individual gains.

BACKGROUND

In at least one known CT system configuration, an x-ray source projects a fan-shaped beam which is collimated to lie within an X-Y plane of a Cartesian coordinate system and generally referred to as the "imaging plane." The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element or cell of the array produces a separate electrical signal that is a measurement of the beam attenuation at that detector location. The attenuation measurements from all the detector cells are acquired separately to produce a transmission profile.

In known CT systems, the x-ray source and the detector array are rotated with a gantry within the imaging plane and around the object to be imaged so that the rotational angle at which the x-ray beam intersects the object constantly changes. A group of x-ray attenuation measurements, i.e., projection data, from the detector array at one gantry rotational angle is referred to as a "view." A "scan" of the object comprises a set of views made at different gantry rotational angles, or view angles, during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units," which are used to control the brightness of a corresponding pixel on a cathode ray tube display and hence produce the image.

As mentioned above, the image corresponds to a two-dimensional slice, or cross-section, of an object. In theory, since the image is two-dimensional, it has no thickness and thereby the measurement flux and detector gain in the z-direction are non-existent and thus uniform. In reality, however, the image is constructed from attenuation measurements supplied by a detector having a finite thickness in the z-direction. The finite thickness of the detector allows for the possibility of a non-uniform measurement flux and a non-uniform detector gain. The inherent thickness of the detector presents problems in trying to construct an accurate two-dimensional image because the composition of the object being scanned (and hence, the measurement flux), as well as the gain of the detector, may vary across the thickness of the detector. In other words, if the attenuation measurement at a certain location comprises part bone and part air, then an image constructed based on the actual attenuation measurement will represent a combination of the bone and air. Similarly, if a bone extends across the entire thickness of the detector, but the detector gain varies across the thickness, then the constructed image will not accurately reflect the composition of the bone. Thus, the attenuation measurements from the detector must be corrected to account for any variation in the detector gain and the measurement flux over the thickness of the image.

These problems are even more pronounced in third generation CT systems using detectors generally known as 2-D detectors. 2-D detectors comprise a plurality of columns and rows of detector cells, where detector cells lined up at different x-locations form a row and detector cells lined up at different z-locations form columns. In a CT system having such a 2-D detector, sometimes referred to as a multislice system, an image may be formed by combining the detector measurements of multiple rows and/or columns of detector cells. Summing a column of cells produces a "macro cell," while macro cells in the same plane produce a "macro row." The detector cell measurements are supplied as inputs to a data acquisition system. If the detector cell measurements to be combined are obtained from detector cells having different individual gains and different fluxes, then the combined measurement represents a weighted sum of the individual detector cell measurements where the different detector cell gains and fluxes cause different weighting. The combined error introduced by detector cell gain and flux differences is object-dependent and cannot be removed by a standard calibration.

To more accurately create an image from such data, it is known to estimate the error due to combining the data from x-ray detector cells having different individual gains. Systems for estimating the error are described in "DETECTOR Z-AXIS GAIN NON-UNIFORMITY CORRECTION IN A COMPUTED TOMOGRAPHY SYSTEM," U.S. Pat. No. 5,734,691, assigned to the present assignee, and "DETECTOR Z-AXIS GAIN CORRECTION FOR A CT SYSTEM," U.S. patent application Ser. No. 08/376,813, filed on Jan. 23, 1995, and assigned to the present assignee. Such correction systems, however, may be improved in a number of respects. Although these systems are able to correct for variations in detector gain measurement flux in the z-direction, the complexity and required computational resources required increase with the order of the correction, i.e. the complexity of the variations in z that must be corrected. This relationship can create conflict between optimizing image quality versus optimizing reconstruction time and cost.

Additionally, these systems comprise a number of z-axis correction factors, where each correction factor depends upon the order of the correction and upon a group of detector segments that the correction is to be applied. Specifically, these systems define a different correction factor for each segment of the detector, where the detector is divided up into a number of segments that overlap in the x-direction. The z-axis correction is then normalized in the x-direction across each segment and the correction for each segment is applied to every detector cell in the segment. The overlapping segments are thereby processed twice, and are smoothed to insure a steady transition from segment to segment. The uniform correction of large segments of the detector, however, tends to skew the correction applied to each individual detector cell or column of cells in the segment. Further, the inclusion of the plurality of overlapping columns requires a duplicative investment in computational time and effort.

Therefore, it would be desirable to more accurately and efficiently create an image from data regardless of the order of the z-axis correction that is required. It further would be desirable to provide such imaging without significantly increasing the cost of the system.

SUMMARY OF THE INVENTION

The present invention provides a system and method that improves the computational efficiency and image quality of the correction of image artifacts resulting from z-axis slope in projection intensity caused by non-uniform patient anatomy interacting with the variation of detector cell to cell gain differences. According to the present invention, a system for producing a tomographic image of an object from projection data comprises an x-ray source emitting x-rays, a detector having a plurality of detector cells, the detector receiving the x-rays and providing the projection data as an output, the projection data representing the attenuation of the x-rays, and an image processor that applies a correction factor to an error factor extracted from the projection data to correct for image artifacts resulting from non-uniformity among the projection data. The correction factor advantageously has a computational complexity that remains substantially the same regardless of the complexity of the non-uniform projection data. Preferably, the projection data are vector equations and the correction factor is a matrix multiplier having variable coefficients depending on the complexity of the non-uniform projection data. The detector may further comprise a plurality of channels, where a column of the detector cells forms each of said plurality of channels. The correction factor comprises a plurality of channel correction factors, where each of the plurality of channels is the center channel for a corresponding segment used to respectively determine each of the channel correction factors. The correction factor is preferably applied during the construction of the image.

In another aspect, according to the present invention, a system for producing a tomographic image of an object from a plurality of x-ray attenuation measurements, comprises an x-ray source emitting x-rays, a detector having a plurality of detector cells, each of the plurality of detector cells receiving the x-rays and providing an output signal representing the attenuation of the x-rays, and an image processor that computes a final correction, based on an initial error factor and a final correction factor, that accounts for z-slope variations among the output signals. Similar to the system above, the computational complexity of the final correction factor is substantially order-independent. The image processor computes an initial correction factor that is computationally complex and order-dependent, and the initial and final correction factors are based on a calibration of the system. The final correction is determined based on the combination of the output signals and the final correction factor. The final correction is calculated as a matrix operation combining the final correction factor and the initial error factor.

The detector further comprises a plurality of channels, where a column of the detector cells forms each of the plurality of channels. The final correction factor comprises a plurality of channel correction factors, where each of the plurality of channels is the center channel for a corresponding segment used to respectively determine each of the channel correction factors. The final correction factor, VF, may be defined by the function:

$$e_i = [VF_i]_{1 \times N} * S(i)_{N \times 1}$$

where:

$$VF_{i,j} = V(i)_{N'+1,j}, j=1, \ldots, N; N=2N'+1;$$

and $V(i)_{N \times N}$ is a correction matrix given by:

$$V(i)_{N \times N} = [Diag(f_i \times SGF_i)_{N \times N}[B_{i,k}]_{N \times (p+1)}$$

$$\alpha_{(p+1) \times N}] + [Diag(f_i \times CGF_i)_{N \times N}[B_{i,k}]_{N \times (p+1)}$$

$$\beta_{(p+1) \times N}] + \ldots + [Diag(f_i \times TGF_i)_{N \times N}[B_{i,k}]_{N \times (p+1)} \gamma_{(p+1) \times N}].$$

$VF_i$ is then a 1×N vector obtained by extracting row i from matrix VF.

In yet another aspect, according to the present invention, a method for correcting projection data for detector cell gain error in a computed tomography system is disclosed. The system comprises an x-ray source emitting an x-ray beam toward a detector having a plurality of detector cells, with the projection data being generated from output signals from the detector cells. The method comprises applying a correction factor to an initial error factor extracted from the projection data to correct for image artifacts resulting from non-uniform projection data, where the complexity of the correction factor remains substantially the same regardless of the complexity of the non-uniform projection data. The projection data are preferably vector equations and the correction factor is a matrix multiplier having variable coefficients depending on the complexity of the non-uniform projection data. The method may further comprise determining a plurality of channels considered for correction, wherein a column of the detector cells forms each of the plurality of channels. And, the correction factor may comprise a plurality of channel correction factors, where each of the plurality of channels is the center channel for a corresponding segment used to respectively determine each of the channel correction factors. Preferably, the correction factor is applied during the construction of the image.

In another aspect, the present invention discloses a method for correcting projection data for detector cell gain error in a computed tomography system. The system comprises an x-ray source for projecting an x-ray beam towards a detector having a plurality of detector cells and the projection data are generated from output signals from the detector cells. The method comprises determining a final error factor that accounts for z-slope variations in the output signals, based upon a final correction factor having a substantially order-independent computational complexity. The final error factor is determined based on the combination of the initial error factor and the final correction factor determined during a calibration of the system.

Additionally, the method may comprise determining a plurality of channels considered for correction, where a column of the detector cells forms each of the plurality of channels. Further, the final correction factor is applied to each of the plurality of channels considered for correction, where the final correction factor comprises a plurality of channel correction factors. Each of the plurality of channels in the final correction factor is the center channel for a corresponding segment used to respectively determine each of the channel correction factors. The final correction, $e_i$, may be defined by the function:

$$e_i = [VF_i]_{1 \times N} * S(i)_{N \times 1}$$

where:

$$VF_{i,j} = V(i)_{N'+1,j}, j=1, \ldots, N; N=2N'+1;$$

and $V(i)_{N \times N}$ is an initial correction matrix given by:

$$V(i)_{N \times N} = [\text{Diag}(f_i \times \text{SGF}_i)_{N \times N} [B_{i,k}]_{N \times (p+1)} \alpha_{(p+1) \times N}] + [\text{Diag}(f_i \times \text{CGF}_i)_{N \times N} [B_{i,k}]_{N \times (p+1)} \beta_{(p+1) \times N}] + \ldots + [\text{Diag}(f_i \times \text{TGF}_i)_{N \times N} [B_{i,k}]_{N \times (p+1)} \gamma_{(p+1) \times N}].$$

DETAILED DESCRIPTION OF THE INVENTION

Figure 1:
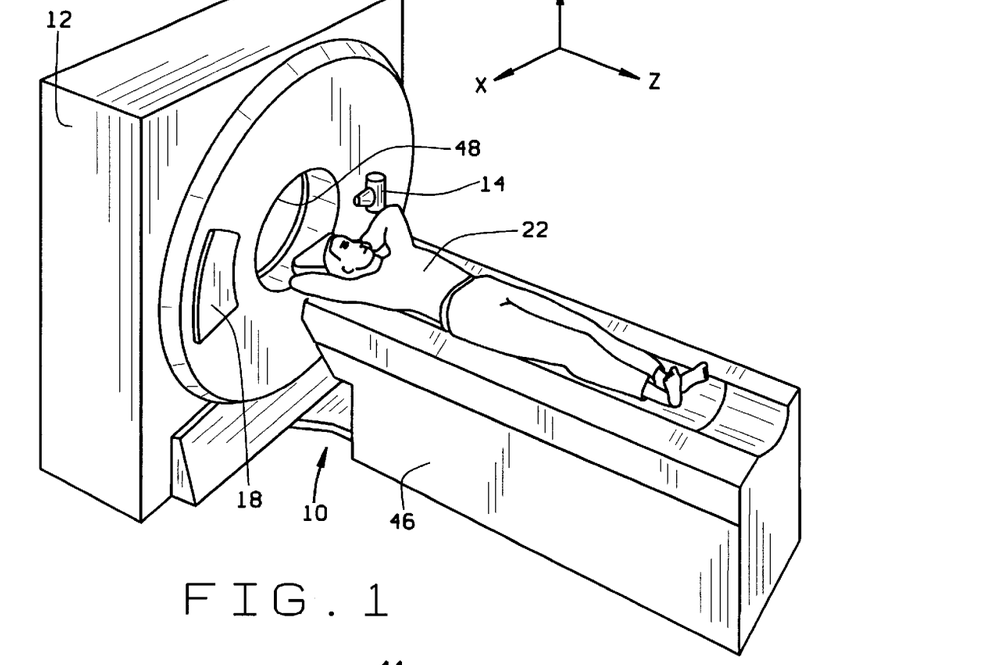
FIG. 1 is a pictorial view of a CT imaging system.
Figure 2:
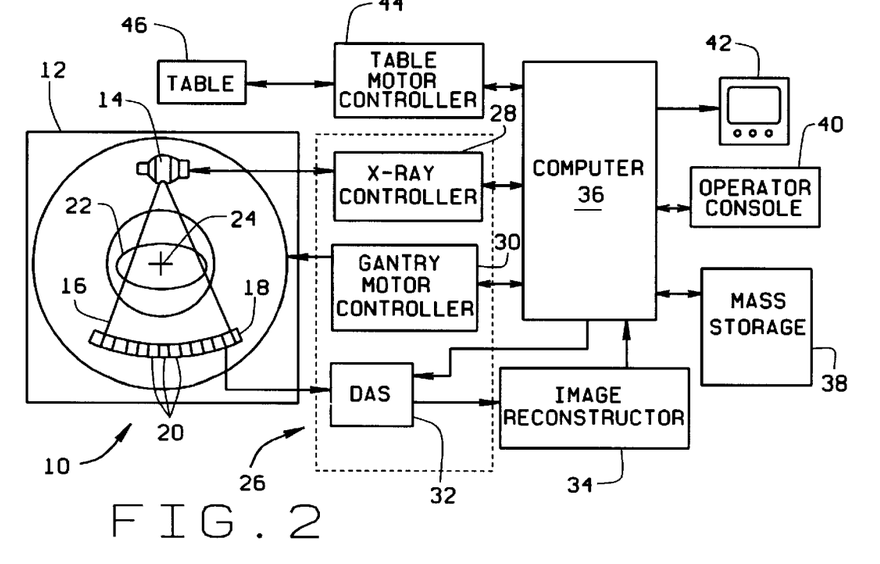
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray projection data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator-supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry aperture 48.

Figure 3:
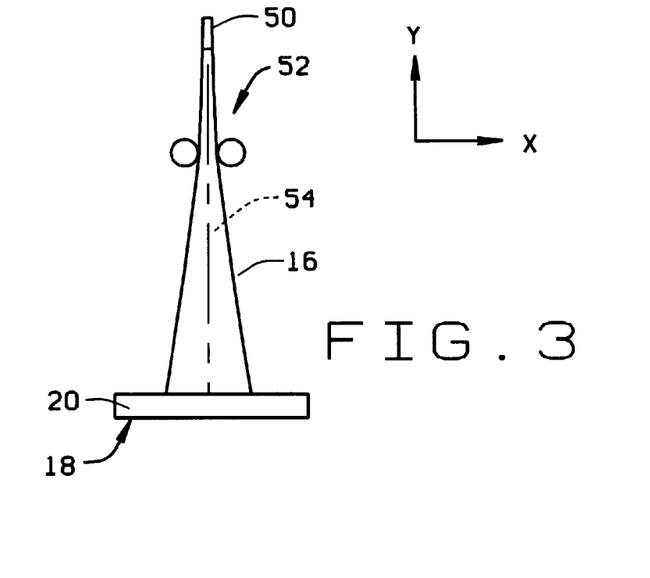
FIG. 3 is a schematic illustration of a beam focal spot, collimator and detector.

Referring to FIG. 3, x-ray beam 16 emanates from a focal spot 50 of source 14 (not shown in FIG. 3). X-ray beam 16 is collimated by a pre-patient collimator 52 and is projected toward detector cell 20 of detector array 18. A plane 54, generally referred to as the "fan beam plane," contains the centerline of focal spot 50 and the centerline of beam 16.

Figure 4:
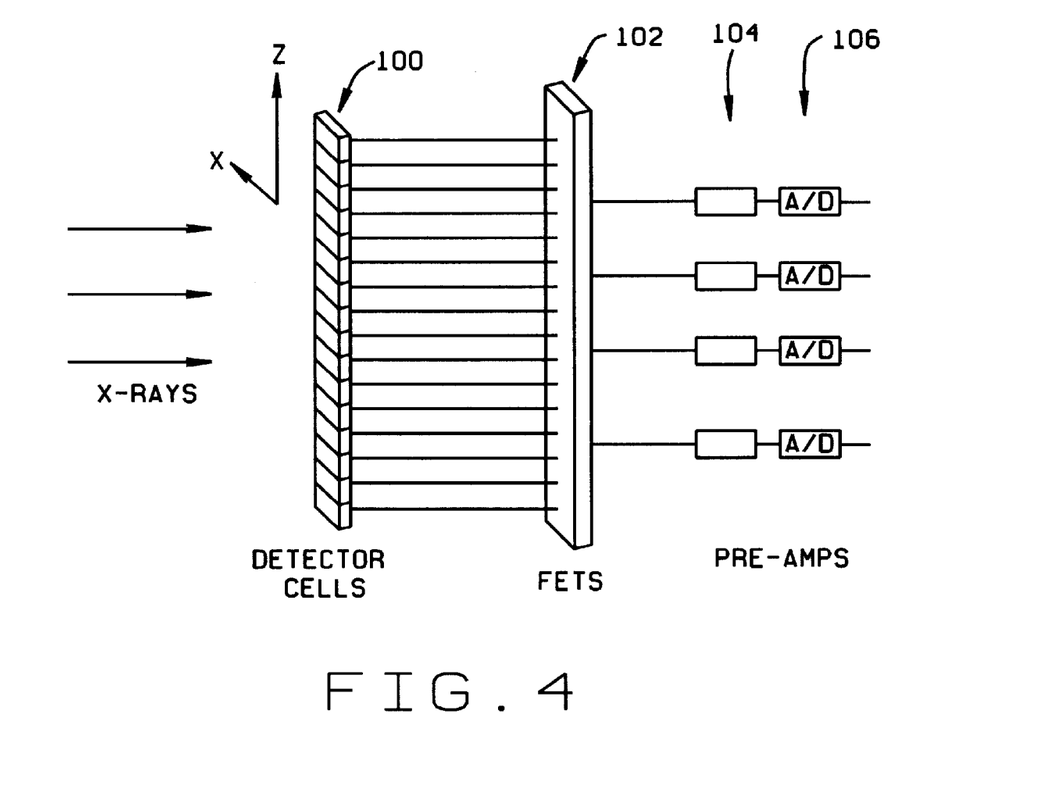
FIG. 4 is a block diagram depiction of a column of detector cells of a detector and related controls.

FIG. 4 illustrates a column of detector cells 100 coupled to switches (e.g. field effect transistors (FETS)) 102. Detector column 100 is composed of a plurality of detector cells arranged in a column. Although not shown, a complete detector is composed of a plurality of detector columns forming rows of detector cells along the z-axis. As explained above, each detector cell produces an electrical signal that represents the intensity of an impinging x-ray beam and hence the attenuation of the beam as it passes through a patient. The output of each cell is supplied through FETs 102 to preamplifiers 104 which supply an amplified signal to analog-to-digital converters 106 that are a part of DAS 32 (FIG. 2). The digitized signal is then supplied to image reconstructor 34 for further processing and image reconstruction.

In operation, FETs 102 controls supply of output signals from each detector cell row to the pre-amplifiers 104. For example, FETs 102 are "opened" and "closed" under the control of switch control assembly (not shown). When a particular FET is closed, the output signal from the corresponding detector cell is provided to pre-amp 104. When the FET is open, no signal is provided by such cell to pre-amp 104.

FETs 102 may enable one or more than one detector cell during a particular sample time. For example, one detector cell in a column may be enabled during each sample time. Two cells also may be enabled during each sample time. Pre-amps 104 provide an amplified output of such signals to A/D converters 106.

Figure 5:
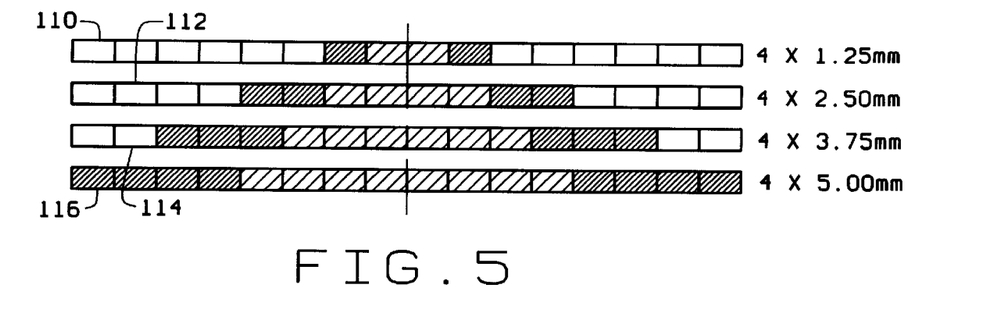
FIG. 5 illustrates detector cell data combining for various thickness image slices.

The number of cells activated in each channel during each sample time is determined by the slice dimensions of the image desired to be reconstructed. For example, as shown in FIG. 5, sixteen detector cells are arranged in a column. Although shown horizontally in FIG. 5, it should be understood that the cells in FIG. 5 correspond to the column shown in FIG. 4. It also should be understood that either more or fewer than sixteen cells may be arranged in a column. The top column 110 corresponds to the cell outputs for an image slice that is 4×1.25 mm in size. The bottom column 116 corresponds to the cell combinations for an image slice that is 4×5.00 mm in size.

With a thin slice (e.g., a 4×1.25 mm slice), no summing of detector cells is performed. In other words, referring to FIG. 5, the output of each of the 4 enabled detector cells comprises a separate signal sent to DAS 32. For a thicker slice (e.g., a 4×2.50 mm slice), detector cell summing is performed. Specifically, for the 4×2.50 mm slice, four separate signals representing the summed output of two adjacent cells (column 2 (112), as indicated by shading) are sent to DAS 32. For the 4×3.75 mm slice (column 3 (116)), three cells are summed, and for the 4×5.00 mm slice (column 4 (118)), four cells are summed. Such summing is performed when acquiring data for thicker slices since for thicker slices, adequate coverage can be obtained and processing time can be reduced by summing the detector cell outputs, and hence the projection data, as set forth above.

When summing detector cell outputs or projection data, however, an error is introduced into the summed signal due to the fact that each detector cell has a different gain. When the detector cell outputs are summed without accounting for the different detector cell gains, the error due to the different gains is included in the resulting signal (e.g., the digitized signal output by A/D converter 106 of DAS 32). Without correction, this error can result in artifacts in the reconstructed image. Additionally, variations in the detector cell outputs, i.e. the measured x-ray fluxes, occur when the object being scanned has anatomy that varies. These flux variations are problematic, especially in the z-direction, because they are scan-dependent and when combined with variable cell gains create errors that cannot be corrected by a gain calibration. Thus, variations in detector cell gains and fluxes are two important factors that, when combined, may cause artifacts in the reconstructed image.

Systems for correcting the projection data for errors resulting from combining signals or projection data are described in "DETECTOR Z-AXIS GAIN NON-UNIFORMITY CORRECTION IN A COMPUTED TOMOGRAPHY SYSTEM," U.S. Pat. No. 5,734,691, assigned to the present assignee, and "DETECTOR Z-AXIS GAIN CORRECTION FOR A CT SYSTEM," U.S. patent application Ser. No. 08/376,813, filed on Jan. 23, 1995, and assigned to the present assignee. Using such systems, a calibration is performed to determine an initial correction factor to account for variations in the individual cell gains in the z-direction. The initial correction factor depends on the order of correction that is desired. As such, there may be a number of initial correction factors, each one for a different order of correction. Additionally, a final correction factor is determined for each slice based on the combination of the detector gain cell variations, and hence the initial correction factor, and the flux within that slice. Similar to the initial correction factor, the final correction factor is order-dependent, and thus there may be a number of final correction factors, one for each order of correction desired. The final correction error is then applied to the projection data during image reconstruction to reduce artifacts in the image. Additionally, according to these methods, the computational complexity of the correction increases with increases in the correction order.

Additionally, both the initial correction factor and the final correction factor comprise a plurality of segment correction factors. The segment correction factors smooth the initial correction factor and final correction factor in the x-direction by dividing the detector into a number of overlapping segments. A segment correction factor is determined for each channel within the segment, with the overlapping detector channels receiving a segment correction factor feathered from one segment to the next segment. In this manner, the final correction factor attempts to provide a smooth correction across the detector.

In these systems, the ability to vary the order of correction is important, because increasing the order of correction allows for correcting more complex errors,. but with the drawback of increasing the computational complexity, time and expense required to reconstruct the image. Thus, image reconstruction requirements may be made that necessitate a trade-off between image quality and computational time and expense.

On the other hand, the present invention advantageously comprises a system that provides an order-independent final correction factor without sacrificing image quality or computational time and expense. The complexity of the final correction factor is greatly reduced, relative to the prior art, and is completely transparent at the time of image reconstruction. The present system streamlines the final correction factor, in contrast to the prior art, which requires order-dependent computational complexity in the final correction factor. The present system beneficially transfers the complexity of the order of correction into the calibration process utilized to determine the final correction factor, as opposed to having complexity in the reconstruction process as in the prior art. Since a calibration typically is performed only once over a relatively long term, 6 months for example, the increased complexity involved in the calibration process and final correction factor does not adversely affect the complexity of the final correction and reconstruction of each and every image. Thus, the present system maximizes the efficiency of the final correction and image reconstruction.

The present system beneficially removes all duplicative computations from the final correction, such as those computations required for feathering, and places those computations in the calibration. In other words, the calibration process that determines the initial correction factor comprises all of the computational complexity of correcting for detector gain and detector flux variations. This allows the projection data, and hence flux variations, of each individual scan to be plugged into the final correction factor to determine a final correction error that is used to correct the projection data. The present invention realizes that the order of correction of the final correction factor can be accounted for in determining the initial correction factor in the calibration process. Thus, the computations for determining the correction based on the final correction factor are the same, regardless of the order of correction, with only certain constants in the computation changing depending on the order. Therefore, the speed and efficiency of the computation of the final correction of the projection data is increased while maintaining image quality.

Additionally, the present invention provides improved image quality by utilizing a moving segment to define the final correction factor, where the moving segment is centered about each channel contained in the final correction factor to determine the correction for that channel. In this way the present invention treats the correction for each channel identically, leading to improved image quality. By centering each channel to determine its correction, the present invention avoids the discontinuity problems due to the varied treatment of each channel associated with the fixed overlapping segments of the prior art. Thus, final correction factor optimizes the correction for each channel by utilizing the moving segment.

More specifically, the present system modifies the calibration steps to take advantage of the processor architecture to recast the z-slope correction in the form of a matrix convolution or matrix multiplier that corresponds to the initial and final correction factors mentioned above. The matrix size may be determined in advance through image quality studies, although the matrix size is influenced by the order of correction in z for reasons of numerical stability when calculating an estimate of a few parameters from many more data points in a least squares computation. Once the size is chosen, then only the matrix coefficients are dependent on the z-order.

Additionally, the present invention utilizes a sliding segment, as opposed to the fixed, overlapping segments, wherein only the center channel of the segment is utilized in the final correction matrix. By sliding the segment of interest for the definition of the matrix correction for a given channel, one final correction matrix is defined which eliminates the segment overlaps, further reducing the number of final correction calculations by about 20%, and greatly streamlining implementation.

The integration of the order-dependent complexity into the calibration process, along with implementation of one final correction matrix based on the sliding segment procedure, combine to transfer all of the complexity of the z-slope correction to the calibration process. As a result, the correction processing at scan time is very streamlined and efficient.

The system of the present invention may have numerous embodiments, as one skilled in the art will realize. An example of a particular system follows, but this example is not intended to be limiting. Assuming that four detectors are combined in the z direction to define a 5 mm slice, the algorithm operates as follows. The four detectors to be combined have individual gains $g_k$ where k=1, 2, 3, and 4. The x-ray intensity seen by each individual detector is $I_k$ where k=1, 2, 3, 4. The measured data, denoted as Y, is modeled as follows:

$$Y = \sum_{k=1}^{k=4} g_k I_k \quad (1)$$

To normalize the detector gains and the gain-normalized data $I_m$ is given by:

$$I_m = Y/G = \sum_{k=1}^{k=K} \frac{g_k}{G} I_k \quad (2)$$

where G is the average gain of the macro-row to be considered, i.e.:

$$G = \frac{1}{k} \sum_{k=1}^{k=K} g_k \quad (3)$$

The measurement desired to be obtained, denoted as I, is:

$$\bar{I} = \sum_{k=1}^{k=K} I_k \quad (4)$$

The gain of each individual detector is expressed as:

$$g_k = G + \delta g_k \quad (5)$$

where $\delta g_k$ is the remaining part of $g_k$. The physical meaning of $\delta g_k$ is the gain variation of the detectors. Using equation 5 with equation 2, factorizing G and recalling equation 4 provides:

$$I_m = \bar{I} + \sum_{k=1}^{k=K} \frac{\delta g_k}{G} I_k \quad (6)$$

Equation 6 relates the true signal, I, the signal derived from the measured data, $I_m$, and the error due to the detector z-axis gain variation.

Defining the ideal projection, $P_i$, and the measurement projection, P, as:

$$P_i = -\log(\bar{I}) \quad (7)$$

$$P = -\log(I_m) \quad (8)$$

and with $\log(1+x) \approx x$, and $I_m \approx I$, then:

$$P = Pi + E \quad (9)$$

where $$E = -\sum_{k=1}^{k=K} \frac{\delta g_k}{G} \frac{I_k}{\bar{I}} \quad (10)$$

This equation in one form or another is the essential starting point for the z-slope correction algorithms. By specifying a limited-order expansion for the signals $I_k$, a correction equation that can be directly implemented is obtained. To the first order in the z-direction:

$$\tilde{I} \approx I_0 \exp[-l(z_0)] \quad (11)$$

while:

$$I_k = I_0 \exp[-l(z_k)] \approx I_0 \exp[-l(z_o)] - (z_k - z_o) \times l'(z_o)] \quad (12)$$

Accordingly, to the first order:

$$E = -\sum_{k=1}^{k=K} \frac{g_k}{G} x[1 - l'(z_o) \times (z_k - z_o)] = l'(z_o) \sum_{k=1}^{k=K} \frac{\delta g_k}{G} \times (z_k - z_o) \quad (13)$$

This equation forms the basis for a first order z-slope correction implementation.

Further, consider a segment of the detector bank comprising N channels, and let $[m_{i,j}]_{p \times q}$ denote a matrix with p rows and q columns, with elements $m_{ij}$. The system calibration process defines a matrix of normalized nominal gains $[G_{Nchannel \times 16}]$, where Nchannel is the total number of channels across the detector considered for z-slope correction, and 16 is the number of detector cell rows on the detector (the number of rows in z). These nominal gains, which are closely related to, but somewhat different from, the $\delta g/G$ in equation 10 above. The difference is due to the normalization process of dividing the gain of each cell by an average of the cell gains, calculated in the x-direction. Considering now the sub-matrix of G associated with a given segment, and K given rows (out of the 16) that are "summed" together, the Slope Gain Factors (SGFs) are then defined for N channels by:

$$[SGF_i]_{N \times 1} = [G_{i,k}]_{N \times K} [z_k^1]_{K \times 1} \quad (14)$$

where $[Z]_{K \times 1}$ is a z-basis function that depends on the number, K, of cell rows averaged together to define a macro-row. The SGF terms correspond to $$\sum_{k=1}^{k=K} \frac{\delta g_k}{G} \times (z_k - z_0) \quad (15)$$

in equation 13. For instance, assuming four rows averaged together:

$$[z_k^1]_{4 \times 1} = [-1.5, -0.5, 0.5, 1.5]^T \quad (16)$$

the unit of distance being taken here to be the cell length in z.

Defining the following vectors:

$$[l_i]_{N \times 1} [\hat{l}_i]_{N \times 1} [l_{z,i'}]_{N \times 1} [\tilde{l}_i]_{N \times 1} \quad (17)$$

to represent, respectively, the "true" line integral samples, the estimates of the line integral samples provided by the detector and subsequent processing, the derivative with respect to z (really with respect to the cone angle) of the line integral, and the corrected estimates of the line integral samples, then analysis of the physics of the detection shows that, to the first order:

$$[\tilde{l}_i]_{N \times 1} = [l_i]_{N \times 1} + [SGF_i]_{N \times 1} * [l_{z,i'}]_{N \times 1} \quad (18)$$

This is restatement of equations 10 and 13 in vector form. In equation 18 the star "*" denotes the point-by-point vector multiplier:

$$[A_i]_{N \times 1} * [B_k]_{N \times 1} = [A_i \times B_i]_{N \times 1} \tag{19}$$

Letting HP denote a high-pass filter, applied along "x," that is operating on the index i (channel direction), and assuming that the true line integral data do not vary rapidly along x:

$$HP\{[l_i]_{N \times 1}\} \approx [0]_{N \times 1} \tag{20}$$

Accordingly, the following "error vector" E is obtained:

$$[E_i]_{N \times 1} = HP\{[\hat{l}_i]_{N \times 1}\} \approx HP\{[SGF_i]_{N \times 1}\} * [l_{z,i}']_{N \times 1} \tag{21}$$

Note that with proper border treatment:

$$HP\{[SGF_i]_{N \times 1}\} = HP\left\{[G_{i,k}]_{N \times K}\left[Z^{\frac{1}{k}}\right]_{K \times 1}\right\} = HP\{[G_{i,k}]_{N \times K}\}\left[Z^{\frac{1}{k}}\right]_{K \times 1} \tag{22}$$

In equation 21 above, it is assumed that the z-derivation of the line integral varies slowly and may be pulled out of the high-pass operator. It is desirable to reduce the number of independent parameters to be estimated from the data. Accordingly, by expanding the z-slope vector [1'] along "x" on p+1 basis vectors $\{[B_0], \ldots, [B_p]\}$:

$$[l_{z,i}']_{N \times 1} = \sum_{k=0}^{k=p} s_k [B_{i,k}]_{N \times 1}; \text{ elements: } l_{z,i}' = \sum_{k=0}^{k=p} s_k [B_{i,k}] \tag{23}$$

The number of parameters to be estimated is reduced from the N number of 1's to the p+1 slope expansion coefficients $\{s_k\}_k = 0, \ldots p$; where p is a parameter of the method, and results are obtained using least squares with p=1 (simple correlation) to p up to 9. Two examples of basis vectors are now given.

1) Monomial polynomial expansion:

$$[B_{i,k}]_{N \times 1} = [X_{i,k}]_{N \times 1} = [X_i^k]_{N \times 1} = [(X_i^1)^k]_{N \times 1} \tag{24}$$

$$[(X_i^1)^k]_{N \times 1} = \left[\left(-\frac{N}{2}\right)^k, \ldots, (-1)^k, 0, \ldots, \left(\frac{N}{2}-1\right)^k\right]^T \tag{25}$$

2) Chebyshev polynomial expansion:

$$[B_{i,k}]_{N \times 1} = [T_{i,k}]_{N \times 1} = \left[\cos\left\{k \times \arccos\left(\frac{2}{N} \times [X_i^1]_{N \times 1}\right)\right\}\right]; \tag{26}$$

with: $[X_i^1]_{N \times 1}$ as above.

In the equations above, a function operating on a vector is a short-hand notation representing a vector where the function has been applied to each vector point. Substituting in equation 21, the following expression is obtained for the error vector:

$$[E_i]_{N \times 1} = HP\{[l_i']_{N \times 1}\} = \tag{27}$$

$$(HP\{[SGF_i]_{N \times 1}\} \cdot ([B_{i,0}], [B_{i,1}], \ldots, [B_{i,p}]))_{N \times (p+1)} \begin{bmatrix} s_0 \\ \vdots \\ s_p \end{bmatrix}_{(p+1) \times 1}$$

The matrix AA, N rows, (p+1) columns, is defined by:

$$AA_{N \times (p+1)} = HP\{[SGF_i]_{N \times 1}\} * ([B_{i,0}], [B_{i,1}], \ldots, [B_{i,p}])_{N \times (p+1)} \tag{28}$$

so that its elements are given by:

$$AA_{i,j} = HP\{[SGF_i]_{N \times 1}\} \times B_{i,j-1} \tag{29}$$

It is crucial to note that the method outlined above assumes that all the calculated error vector components are due to the z-slope artifacts, cf. equations 20 and 21. Naturally, that is only an approximation, as the result the high pass filter HP also includes contributions from the rapidly varying components of the projections, due to changing anatomy (such as the edge of a rib). Two steps are taken to attempt to separate the z-slope error from legitimate anatomy variation. First, the error vector is clipped, so that contributions to the z-slope error term are limited. Larger variations, such as those expected at the edge of dense objects (bones), should not be misconstrued as being caused by the z-slope. Secondly, the error vector is averaged over a number of views. Indeed, for slope artifacts to show in the image (chiefly in the form of rings, arcs, bands, and various "smudges"), three conditions are required: (1) non-uniform gains in z and in x, (2) slope anatomy in z (or more generally signal slope in z), which (3) should vary slowly over a number of views. As the gain variations typically are defined by the detector and do not vary from view to view, averaging the error vector over several views allows transient contributions (as from bone edges) to be averaged out.

The system for slope-only (first order) correction is then given by the following steps:

1) Compute the error estimate:
  1.1) High-pass filtering of the projection data:
    For instance, unsharp masking:

$$E_i = HP\{[\hat{l}i]\} = \hat{l}i - \text{boxcar}(\hat{l}i) \tag{30}$$

1.2) Clipping:
    If $E_i$ > Threshold $E_i$ = Threshold
    If $E_i$ < −Threshold $E_i$ = Threshold
  1.3) View average:
    $E_i$ − moving average of the($E_j$)
2) calculate the slope expansion coefficients via the inverse of matrix AA:

$$\begin{bmatrix} S_0 \\ \vdots \\ S_p \end{bmatrix}_{(p+1) \times 1} = AA^{-1}_{(p+1) \times N} [E_i]_{N \times 1} \tag{31}$$

and then calculate the slope and the error estimate:

$$[e_i]_{N \times 1} = \left[\sum_{k=0}^{k=p} s_k [B_{i,k}]_{N \times 1}\right] * [SGF_i] \tag{32}$$

and subtract from the original line integral estimates to obtain:

$$[\tilde{t}_i]_{N \times 1} = [\hat{l}_i]_{N \times 1} - [e_i]_{N \times 1} \tag{33}$$

where the tilde designates the corrected estimates of the line integral samples. The inverse matrix $AA^{-1}$ is calculated (in calibrations) using the Singular Value Decomposition (SVD) method. The SVD provides the minimum-norm least-squares solution for a linear system problem with more equations than unknowns. The process is done for each segment, and then the correction is blended across the segment overlaps using a feathering function originally derived for half-scan weighting.

The system for correction as described above relies on a number of assumptions regarding actual "z-slope data behavior," and includes a yet larger number of parameters. Additionally, improved results are obtained by expanding the z-signal on three basis functions. This is done by writing, to the third order:

$$[\hat{l}_i]_{N\times 1} = [l_i]_{N\times 1} + [SGF_i]_{N\times 1} * [l'_{z,i}]_{N\times 1} + \quad (34)$$
$$[CGF_i]_{N\times 1} * [l''_{z,i}]_{N\times 1} + [TGF_i]_{N\times 1} * [l'''_{z,i}]_{N\times 1}$$

where l" and l'" denote respectively the second and third derivative of the signal with respect to z. CGF and TGF are Curvature Gain Factors and Third Order Gain Factors, respectively, and are defined by the equations (for one segment):

$$[CGF_i]_{N\times 1}=[G_{i,k}]_{N\times K}[(Z_k^1)^2]_{K\times 1} \quad (35)$$

$$[TGF_i]_{N\times 1}=[G_{i,k}]_{N\times K}[(Z_k^1)^3]_{K\times 1} \quad (36)$$

Expanding l" and l'" in x, as was done for l':

$$[l''_{z,i}]_{N\times 1} = \sum_{k=0}^{k=p} c_k[B_{i,k}]_{N\times 1}; \quad l''_{z,i} = \sum_{k=0}^{k=p} c_k B_{i,k} \quad (37)$$

where the $c_k$'s are the z-curvature "x" expansion coefficients, and $$[l'''_{z,i}]_{N\times 1} = \sum_{k=0}^{k=p} c_k[B_{i,k}]_{N\times 1}; \quad l'''_{z,i} = \sum_{k=0}^{k=p} c_k B_{i,k} \quad (38)$$

where the $t_k$'s are the z-third order "x" expansion coefficients. Accordingly the matrix AA can be redefined (for one segment) as:

$$AA^{-1}_{N\times [3(p+1)]} = [3(p+1)]\times 1 \quad (39)$$
$$(HP\{[SGF_i]\}*([B_{l,0}], \ldots, [B_{l,P}]),$$
$$HP\{[CGF_i]\}*([B_{l,0}], \ldots, [B_{i,p}]),$$
$$HP\{[TGF_i]\}*([B_{i,0}], \ldots, [B_{i,p}]))$$

and the slope, curvature, and the third expansion coefficients are given at the scan data correction step by:

$$\begin{bmatrix} s_0 \\ \vdots \\ s_p \\ c_0 \\ \vdots \\ c_p \\ t_0 \\ \vdots \\ t_p \end{bmatrix} = AA^{-1}_{[3(p+1)]\times N}[E_i]_{N\times 1} \quad (40)$$

In the equation above, it is assumed that the "x" expansion basis order p is the same for the slope, curvature, and the third order terms; however, that need not be the case. Equation 40 relates the initial error vector E to the slope, curvature, and third order expansion coefficients $(s_i)_{i=0,\ldots,p}$, $(c_i)_{i=0,\ldots,p}$, $(t_i)_{i=0,\ldots,p}$, via the inverse matrix $AA^{-1}$. The final error vector estimate is then given by:

$$[e_i]_{N\times 1} = \left[\sum_{k=0}^{k=p} s_k[B_{i,k}]_{N\times 1}\right]*[SGF_i] + \left[\sum_{k=0}^{k=p} c_k[B_{i,k}]_{N\times 1}\right]*[CGF_i] + \quad (41)$$
$$\left[\sum_{k=0}^{k=p} t_k[B_{i,k}]_{N\times 1}\right]*[TGF_i]$$

where B is the matrix of basis function, and SGF, CGF, and TGF, are the slope gain factor, curvature gain factor, and third order gain factors, respectively.

The present invention advantageously relates e and E by substituting equations 14 and 35–38 into equation 41, and also using equation 40 to factorize out E. The result, in matrix form is:

$$[e_i]_{N\times 1}=V_{N\times N}[E_i]_{N\times 1} \quad (42)$$

where $V_{N\times N}$ is given by:

$$V_{N\times N}=[Diag(f_i\times SGF_i)_{N\times N}[B_{i,k}]_{N\times (p+1)}$$
$$\alpha_{(p+1)\times N}]+[Diag(f_i\times CGF_i)_{N\times N}[B_{i,k}]_{N\times (p+1)}$$
$$\beta_{(p+1)\times N}]+ \ldots +[Diag(f_i\times TGF_i)_{N\times N}[B_{i,k}]_{N\times (p+1)}\gamma_{(p+1)\times N}] \quad (43)$$

The terms are defined as follows: Diag( ) represents a diagonal matrix; α, β, and γ are matrices obtained by extracting the first (p+1) rows, the second (p+1) rows and the last (p+1) rows, respectively, out of matrix $AA^{-1}$; and $f_i$ are the segment blending weights, or feathering weights. Clearly, V can be expressed as the sum of as many matrices as the z-order requires. Note however, that at correction time, only one matrix is multiplied by the initial error vector to yield the final error estimate.

Processing with matrices V as obtained above, however, still requires segmentation of the detector channels (in 'x') with each segment of length N overlapping its neighbors (for instance, by N/3 channels). The overlap is taken into consideration by the feathering weights f. It is clear that each channel in an overlap region requires twice the amount of processing. Further, data flow is not seamless, requiring frequent loads into memory that slow down the processing.

Figure 6:
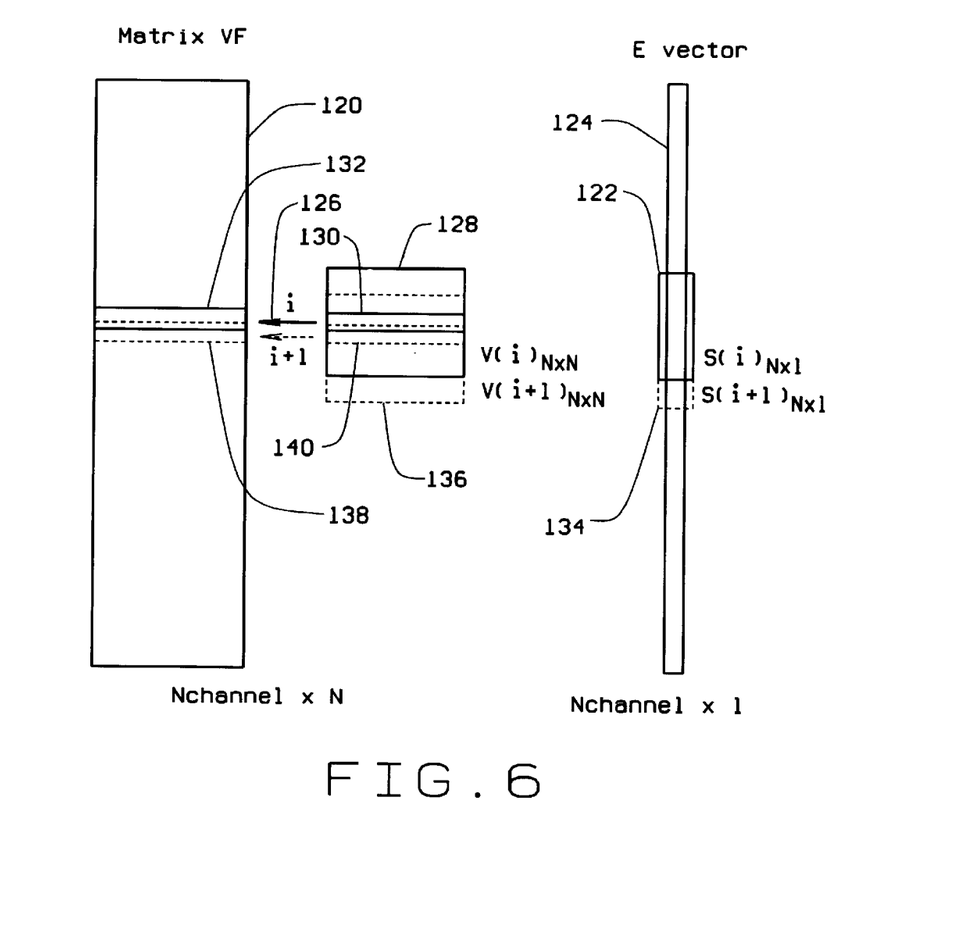
FIG. 6 is a schematic representation of the definition of the final correction matrix of the present invention.

Referring to FIG. 6, the present system overcomes these problems by advantageously defining one final correction matrix VF 120 of size (Nchannel×N), where Nchannel is the total number of channels to be corrected for z-slope errors, and N is the segment length required for the calculation of the inverse matrices $AA^{-1}$. This is achieved by considering a given segment S(i) 122 of initial error vector E 124 with odd size N=2N'+1, centered on channel I 126. The odd size of segment S(i) 122 insures that the channel I 126 of interest is at the center of the segment. Calculations proceed as above to define matrix $V(i)_{N\times N}$ 128. Out of V(i) 128, only one row 130, row N'+1, is retained to define one row 132 of final matrix VF 120, where:

$$VF_{Nchannel\times N} \text{ defined by: } VF_{i,j}=V(i)_{N'+1,j}; j=1, \ldots, N. \quad (44)$$

Next, segment S(i) 122 is shifted by one channel to define S(i+1) 134 and a corresponding V(i+1) 136. One row 138 of VF, row i+1, is defined by extracting one row 140, row N'+1, from V(i+1) 136, and so on.

This process requires a great many more calculations than in the previous calibration method, since for each channel an inverse matrix is calculated taking into account N channels.

This processing is done only every few months as required by z-slope calibration, however, and does not have to be fast. It may even be performed by using a fourth generation language such as PV-WAVE, as opposed to optimized C code. The following benefits, however, result: correction processing overlaps are eliminated (the feathering weights are set to 1.0), thus saving a significant fraction of correction processing time (one third in the example above where the overlap was N/3); and, importantly, the system is greatly streamlined. The correction matrix can be updated one channel at a time. The entire range of channels to be corrected can be processed within a single code loop, without interrupts or branch jumps.

The final correction equation is then:

$$e_i = [VF_i]_{1 \times N} * S(i)_{N \times 1} \qquad (45)$$

The above system was extensively tested, and it was shown that there was no loss of correction efficiency, as compared to the prior art. The image quality of the present invention, using a second order correction, is equal or better than that of the prior art, second order, and it runs faster than the prior art, first order.

From an image quality standpoint, the sliding segment of the present invention allows the maximum flexibility in choosing the segments: for a given segment size, determined by IQ considerations such as stability of the inverse matrix calculation, each channel "sees" correction coefficients (a row of matrix VF) calculated as if that channel were at the segment center. Additionally, the computational benefits have been quantified using a final software implementation on a target architecture: on the reconstruction hardware, the new second order correction runs 6.1 times faster than the previous second order correction, and 3.3 times faster than the previous first order correction.

In accordance with one embodiment of the present invention, data provided to computer 36 (FIG. 2) typically first is preprocessed by image reconstructor 34 to correct for various well-known errors such as beam-hardening. The present correction algorithm may be implemented to form a part of such preprocessing after beam-hardening correction but before PCAL correction. Alternatively, the present invention may be implemented at any time prior to image reconstruction.

In summary, the present system improves the computational efficiency and image quality of the correction of image artifacts resulting from z-axis slope in projection intensity caused by non-uniform patient anatomy interacting with the variation of detector cell to cell gain differences. As described above, a z-axis slope gain calibration is performed to determine individual detector cell gains and generate initial z-axis slope correction factors, based on the desired order of correction. All of the complexity of the final correction is transferred to the gain calibration to improve the speed and efficiency of the final correction. Additionally, the system of the present invention defines the final correction matrix VF. For each channel i, an inverse matrix V(i) is defined, corresponding to segment S(i), extracted from the initial error estimate E. Only the center row of V(i) is retained to define row i of VF. The segment S(i) is shifted by one channel, to define S(i+1), and the process is repeated. Thus, only the coefficients of the final correction matrix VF change, depending on the desired order of correction. Therefore, the present system reduces the computational complexity of applying the final correction factor without regard to the order of correction, and further improves the image quality resulting from the final correction factor.

The present invention described above may be used with a plurality of detector cells in the z-direction. For example, the above-described system may be implemented with a twin slice CT system, i.e., with a system having two rows of detector cells in the z-direction. Similarly, the present invention may be implemented with a single slice CT system. Alternatively, the present system may be implemented in multislice CT systems having more than two rows of detector cells in the z-direction.

Although the invention has been described and illustrated in detail, it is to be clearly understood that the same is intended by way of illustration and example only and is not to be taken by way of limitation. For example, the CT system described herein is a "third generation" system in which both the x-ray source and detector rotate with the gantry. The present invention, however, may be used with many other CT systems including "fourth generation" systems wherein the detector is a full-ring stationary detector and only the x-ray source rotates with the gantry. The present invention could also be utilized in connection with step-and-shoot as well as helical scanning type CT systems. In addition, the correction algorithm described herein may be used in connection with both single slice and multislice CT systems. Moreover, although the present invention, in one form, has been described being performed on data subsequent to beam-hardening correction, the present invention could be implemented at various points in the data correction/processing. Accordingly, variations and modifications of the present invention will be apparent to one skilled in the art and the following claims are intended to cover all such modifications and equivalents.

What is claimed is:

1. A system for producing a tomographic image of an object from projection data, comprising:

an x-ray source emitting x-rays;

a detector having a plurality of detector cells, said detector receiving said x-rays and providing said projection data as an output, said projection data representing the attenuation of said x-rays; and an image processor that applies a correction factor to an error factor extracted from said projection data to correct for image artifacts resulting from non-uniformity among said projection data, said correction factor having a computational complexity that remains substantially the same regardless of the complexity of said non-uniform projection data.

2. A system as recited in claim 1, wherein said projection data are vector equations and said correction factor is a matrix multiplier having variable coefficients depending on the complexity of said non-uniform projection data.

3. A system as recited in claim 1, wherein said detector further comprises a plurality of channels, a column of said detector cells forming each of said plurality of channels; and wherein said correction factor comprises a plurality of channel correction factors, wherein each of said plurality of channels is the center channel for a corresponding segment used to respectively determine each of said channel correction factors.

4. A system as recited in claim 1, wherein said correction factor is applied during the construction of said image.

5. A system for producing a tomographic image of an object from a plurality of x-ray attenuation measurements, comprising:

an x-ray source emitting x-rays;

a detector having a plurality of detector cells, each of said plurality of detector cells receiving said x-rays and providing an output signal representing said attenuation of said x-rays; and an image processor that computes a final correction, based on an initial error factor and a final correction factor, that accounts for z-slope variations among said output signals, wherein the computational complexity of said final correction factor is substantially order-independent.

6. A system as recited in claim 5, wherein said image processor computes an initial correction factor that is computationally complex and order-dependent, said initial correction factor and said final correction factor based on a calibration of said system; and wherein said final correction is determined based on the combination of said output signals and said final correction factor.

7. A system as recited in claim 6, wherein said detector further comprises a plurality of channels, a column of said detector cells forming each of said plurality of channels; and wherein said final correction factor comprises a plurality of channel correction factors, wherein each of said plurality of channels is the center channel for a corresponding segment used to respectively determine each of said channel correction factors.

8. A system as recited in claim 7, wherein said final correction, $e_i$, is defined by the function:

$$e_i = [VF_i]_{1 \times N} * S(i)_{N \times 1}$$

where:

$$VF_{i,j} = V(i)_{N+1,j}; \, j=1, \ldots, N; \, N=2N'+1;$$

and $V(i)_{N \times N}$ is a correction matrix given by:

$$V(i)_{N \times N} = [\text{Diag}(f_i \times SGF_i)_{N \times N}[B_{i,k}]_{N \times (p+1)}\alpha_{(p+1) \times N}] + [\text{Diag}(f_i \times CGF_i)_{N \times N}[B_{i,k}]_{N \times (p+1)}\beta_{(p+1) \times N}] + \ldots + [\text{Diag}(f_i \times TGF_i)_{N \times N}[B_{i,k}]_{N \times (p+1)}\gamma_{(p+1) \times N}].$$

9. A method for correcting projection data for detector cell gain error in a computed tomography system, the system comprising an x-ray source emitting an x-ray beam toward a detector having a plurality of detector cells, the projection data being generated from output signals from the detector cells, comprising:

applying a correction factor to an initial error factor extracted from the projection data to correct for image artifacts resulting from non-uniform projection data, wherein the complexity of the correction factor remains substantially the same regardless of the complexity of the non-uniform projection data.

10. A method as recited in claim 9, wherein the projection data are vector equations and the correction factor is a matrix multiplier having variable coefficients depending on the complexity of the non-uniform projection data.

11. A method as recited in claim 9, further comprising:

determining a plurality of channels considered for correction, wherein a column of the detector cells forms each of the plurality of channels; and wherein the correction factor comprises a plurality of channel correction factors, wherein each of the plurality of channels is the center channel for a corresponding segment used to respectively determine each of the channel correction factors.

12. A method as recited in claim 9, wherein the correction factor is applied during the construction of the image.

13. A method for correcting projection data for detector cell gain error in a computed tomography system, the system comprising an x-ray source for projecting an x-ray beam towards a detector having a plurality of detector cells, the projection data being generated from output signals from the detector cells, the method comprising:

determining a final error factor that accounts for z-slope variations in the output signals, based upon a final correction factor having a substantially order-independent computational complexity.

14. A method as recited in claim 13, wherein the final error factor is determined based on the combination a computationally complex, order-dependent, initial correction factor determined during a calibration of the system.

15. A method as recited in claim 14, further comprising:

determining a plurality of channels considered for correction, wherein a column of the detector cells forms each of the plurality of channels; and applying the final correction factor to each of the plurality of channels considered for correction, wherein the final correction factor comprises a plurality of channel correction factors, wherein each of the plurality of channels is the center channel for a corresponding segment used to respectively determine each of the channel correction factors.

16. A method as recited in claim 15, wherein the final error factor, $e_i$, is defined by the function:

$$e_i = [VF_i]_{1 \times N} * S(i)_{N \times 1}$$

where:

$$VF_{i,j} = V(i)_{N+1,j}; \, j=1, \ldots, N; \, N=2N'+1;$$

and $V(i)_{N \times N}$ is a correction matrix given by:

$$V(i)_{N \times N} = [\text{Diag}(f_i \times SGF_i)_{N \times N}[B_{i,k}]_{N \times (p+1)}\alpha_{(p+1) \times N}] + [\text{Diag}(f_i \times CGF_i)_{N \times N}[B_{i,k}]_{N \times (p+1)}\beta_{(p+1) \times N}] + \ldots + [\text{Diag}(f_i \times TGF_i)_{N \times N}[B_{i,k}]_{N \times (p+1)}\gamma_{(p+1) \times N}].$$

* * * * *

UNITED STATES PATENT AND TRADEMARK OFFICE
CERTIFICATE OF CORRECTION

PATENT NO. : 6,173,029 B1
DATED : February 27, 2001
INVENTOR(S) : Bernhard Durr and Karl-heinz Kloepfer It is certified that error appears in the above-identified patent and that said Letters Patent is hereby corrected as shown below:

<u>Column 6,</u>
Line 12, delete "11".

Signed and Sealed this

Sixteenth Day of October, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,173,029 B1
DATED : January 9, 2001
INVENTOR(S) : Min Xie, et al.

It is certified that error appears in the above-identified patent and that said Letters Patent is hereby corrected as shown below:

Column 10,
Equation (9) delete, "P=P$i$+E" and substitute -- P$\cong$P$i$+E --.

Signed and Sealed this

Thirteenth Day of November, 2001

Attest:

*Nicholas P. Godici*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO. : 6,173,029 B1
DATED : January 9, 2001
INVENTOR(S) : Mic Xie et al.

It is certified that error appears in the above-identified patent and that said Letters Patent is hereby corrected as shown below:

Column 10,
Equation (9), delete "P=P$i$+E" and substitute -- P≅P$i$+E --.

Signed and Sealed this

Twenty-sixth Day of October, 2004

JON W. DUDAS
*Director of the United States Patent and Trademark Office*